(12) United States Patent
Rick (10) Patent No.: US 9,453,853 B2
(45) Date of Patent: Sep. 27, 2016

(54) TARGET SET PROCESSING IN A FLUID FLOW VELOCITY INSTRUMENT TO REDUCE NOISE

(75) Inventor: David Langley Rick, Longmont, CO (US)

(73) Assignee: Hach Company, Loveland, CO (US)

( * ) Notice: Subject to any disclaimer, the term of this patent is extended or adjusted under 35 U.S.C. 154(b) by 681 days.

(21) Appl. No.: 13/571,328

(22) Filed: Aug. 9, 2012

(65) Prior Publication Data

US 2013/0041599 A1 Feb. 14, 2013

Related U.S. Application Data

(60) Provisional application No. 61/521,596, filed on Aug. 9, 2011.

(51) Int. Cl.
*G01P 5/24* (2006.01)
*G01F 1/66* (2006.01)
*G01F 1/00* (2006.01)

(52) U.S. Cl.
CPC ............. *G01P 5/241* (2013.01); *G01F 1/002* (2013.01); *G01F 1/663* (2013.01); *G01F 1/667* (2013.01)

(58) Field of Classification Search
CPC ........ G01F 1/002; G01F 1/667; G01F 1/663; G01P 5/241
See application file for complete search history.

(56) References Cited

U.S. PATENT DOCUMENTS

| | | | |
|---|---|---|---|
| 4,787,252 A * | 11/1988 | Jacobson et al. | 73/861.28 |
| 5,311,781 A | 5/1994 | Gates | |
| 5,821,427 A * | 10/1998 | Byrd | 73/861.25 |
| 5,978,746 A | 11/1999 | Beneteau et al. | |
| 7,194,363 B2 * | 3/2007 | Schaffer et al. | 702/60 |
| 8,339,584 B2 * | 12/2012 | Christian et al. | 356/28.5 |
| 2005/0114046 A1 | 5/2005 | Metcalf et al. | |
| 2005/0241411 A1* | 11/2005 | Hishida et al. | 73/861.25 |
| 2010/0218618 A1* | 9/2010 | Mori et al. | 73/861.28 |
| 2013/0080081 A1* | 3/2013 | Dugger | G01F 1/667 702/48 |

FOREIGN PATENT DOCUMENTS

DE 102008058376 A1 6/2010

OTHER PUBLICATIONS

"Trimmed Mean" by Investopedia, Dec. 28, 2009, available at https://web.archive.org/web/20091228025457/http://www.investopedia.com/terms/t/trimmed_mean.asp.*
European Patent Office, European Search Report for European Patent Application 12 179 824, Nov. 26, 2012, 1 page, Munich, Germany.

* cited by examiner

*Primary Examiner* — Alexander Satanovsky
*Assistant Examiner* — John Kuan
(74) *Attorney, Agent, or Firm* — Ference & Associates LLC (57) ABSTRACT

One aspect provides a fluid flow measurement instrument, comprising: a sensor producing a signal representative of reflections of an emitted signal; and a meter being coupled to the sensor and configured to: produce two or more sub-measurements from said signal representative of reflections of an emitted signal; and compute a fluid flow velocity estimate using the two or more sub-measurement signals. Other aspects are described and claimed.

14 Claims, 4 Drawing Sheets

TARGET SET PROCESSING IN A FLUID FLOW VELOCITY INSTRUMENT TO REDUCE NOISE

This application claims priority to U.S. provisional patent application 61/521,596, entitled "TARGET SET PROCESSING IN A DOPPLER INSTRUMENT TO REDUCE NOISE", filed on Aug. 9, 2011, which is incorporated by reference herein.

BACKGROUND

Fluid flow velocity measurement instruments, for example an ultrasonic Doppler submerged A/V flow meter, use the existence of reflective targets for estimating fluid flow velocity. An underlying assumption on which many meters are based is that the various targets in the fluid are moving at the same speed as the fluid. The fluid flow velocity is often not uniform because, considering an open channel conduit as an example, there is a velocity profile in which fluid closest to a channel wall flows more slowly than fluid towards the center of the channel.

To the extent that targets in the fluid, for example bubbles or particulate matter, are uniform in their size and disposition, the frequency spectrum of ultrasound reflected from a large ensemble of moving targets in the fluid may represent a statistical velocity distribution for the channel, and thus be leveraged to provide an estimate of the fluid flow velocity. The average velocity, which in turn may be used to calculate flow rate, may then be determined by computing the centroid of the Doppler spectrum.

BRIEF SUMMARY

In summary, a fluid flow measurement instrument, comprising: a sensor producing a signal representative of reflections of an emitted signal; and a meter being coupled to the sensor and configured to: produce two or more sub-measurements from said signal representative of reflections of an emitted signal; and compute a fluid flow velocity estimate using the two or more sub-measurement signals.

Another aspect provides a fluid flow estimating method, comprising: producing with a sensor a signal representative of reflections of an emitted signal; and producing two or more sub-measurements from said signal representative of reflections of an emitted signal; and computing a fluid flow velocity estimate using the two or more sub-measurement signals.

A further aspect provides a fluid flow estimating program product, comprising: a device readable storage medium storing program code executable by a processor of a measurement instrument, the program code comprising: program code for producing with a sensor a signal representative of reflections of an emitted signal; program code for producing two or more sub-measurements from said signal representative of reflections of an emitted signal; and program code for computing a fluid flow velocity estimate using the two or more sub-measurement signals.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION OF THE INVENTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Figure 1:
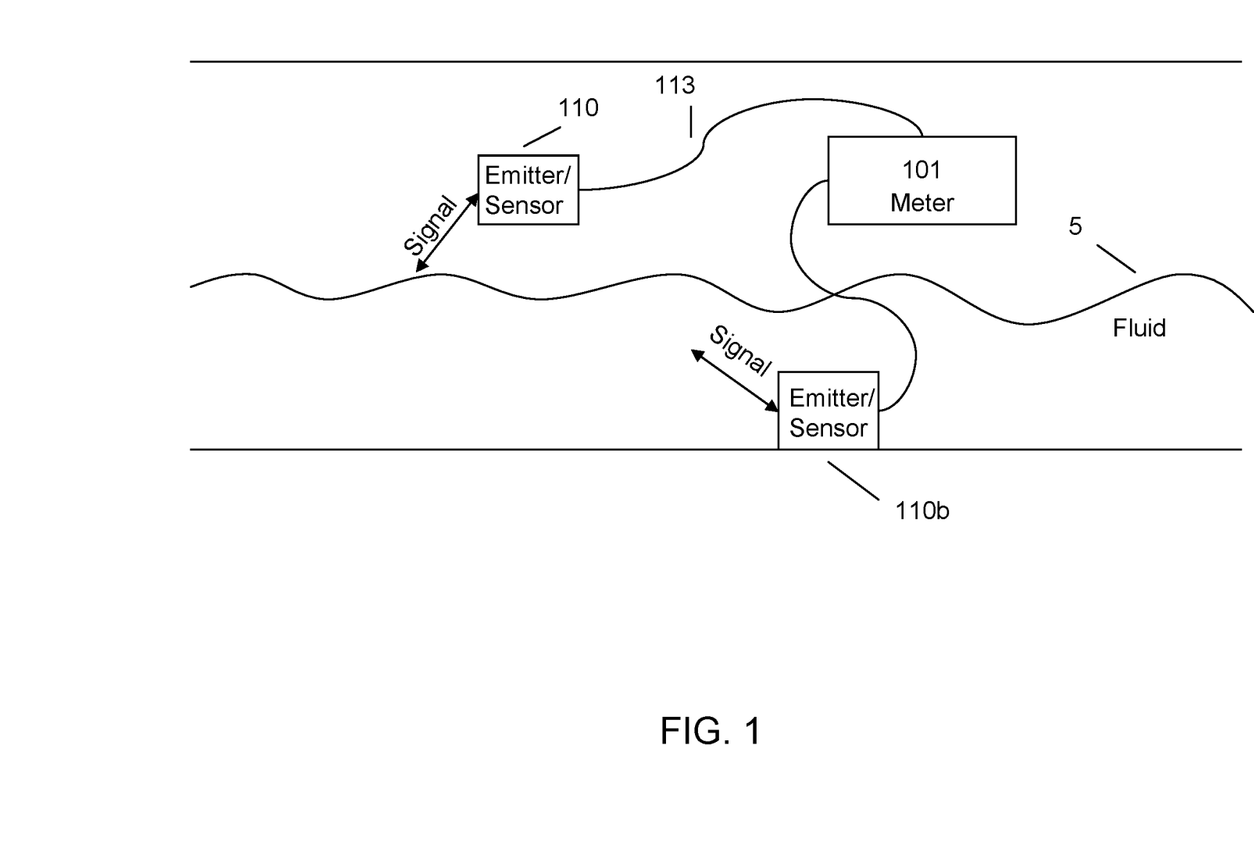
FIG. 1 illustrates an example measurement instrument.

FIG. 1 shows an example Doppler measurement instrument 100 according to an embodiment. The Doppler measurement instrument 100 in the example embodiment illustrated comprises a meter 101 and one or more sensors 110, 110b, also referred to herein as a "probe", as each sensor may transmit or receive frequency based signals, as further described herein. Each sensor 110, 110b may be coupled to the meter 101, for example by cabling 113. As a result, the sensor 110 can be independent from and remote from the meter 101. The Doppler measurement instrument 100 may include multiple sensors or a single sensor. The sensors 110, 110b may be integrated into the meter 101. The sensors 110, 110b interact with the fluid 5 in order to generate a representative electronic measurement signal. The meter 101 receives and processes measurement signals, such as digitized measurement signals derived from frequency based/Doppler measurements produced from the sensors 110, 110b in order to generate velocity measurements, such as fluid velocity measurements.

Figure 2:
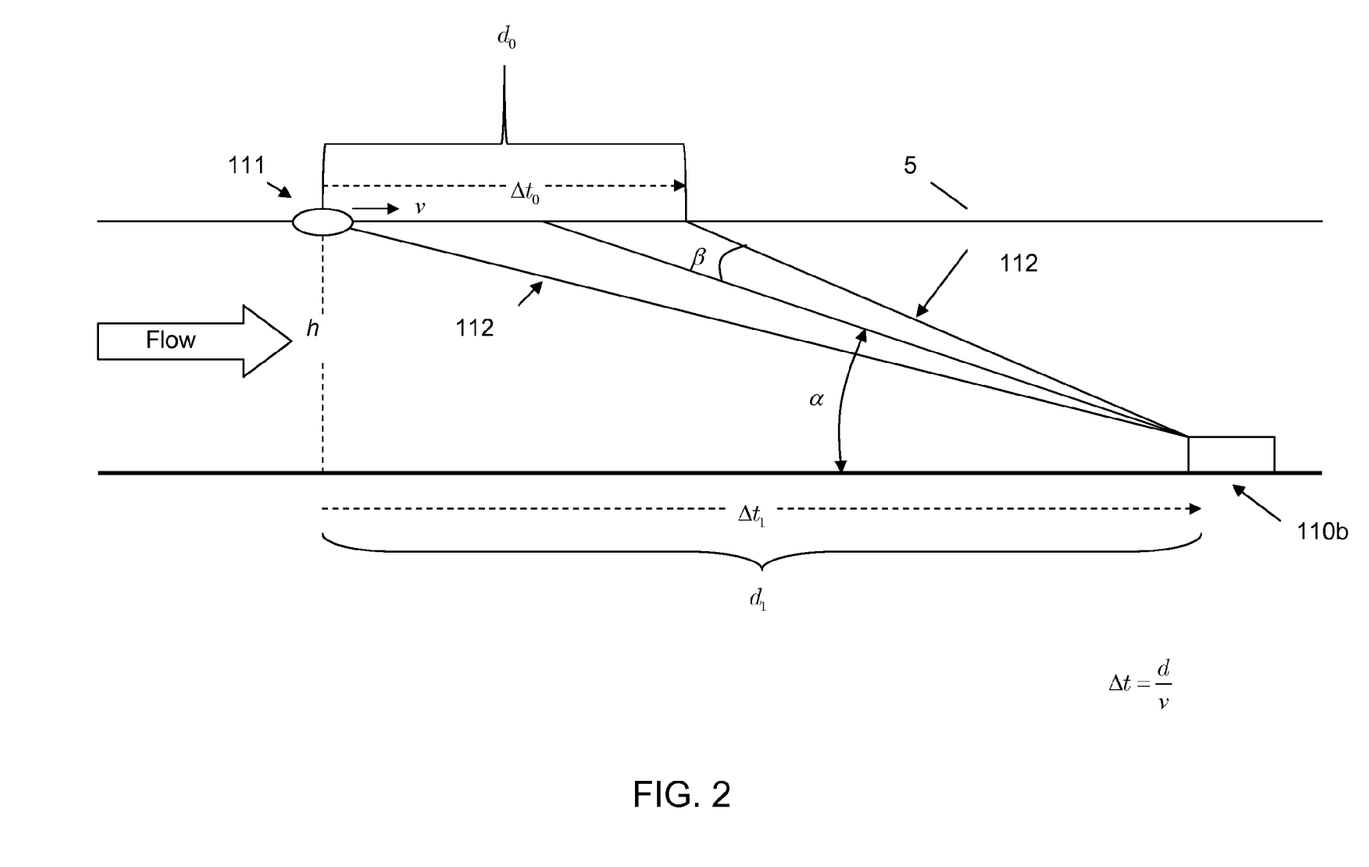
FIG. 2 illustrates an example measurement instrument.

The Doppler measurement instrument 100 is constructed to accommodate and measure a wide range of target velocities. The sensor 110 directs energy toward the fluid 5 in order to measure the fluid velocity. As described further herein, the Doppler measurement instrument 100 may include a submerged sensor 110b, as illustrated in FIG. 1 and FIG. 2. The submerged sensor 110b can be configured and positioned to remain submerged in the fluid 5 most or all of the time.

One application for Doppler measurement instrument 100 is in generating a volume flow rate of fluid flow in a channel. The water can be flowing in an open channel or in a closed channel.

The Doppler measurement instrument 100 may comprise an independent device in some embodiments. Alternatively, the Doppler measurement instrument 100 may be integrated into another device, such as in a fluid flow rate sensor, for example, where the fluid velocity measurement is used for determining a fluid flow rate using the velocity and other factors, such as a fluid depth and flow cross-sectional area.

Fluid velocity measurement presents difficulties, particularly with respect to obtaining reliable measurements of wastewater velocity. Such measurements may be used in the study and management of sewage collection systems. The Doppler measurement instrument 100 may transmit via one or more sensors 110, 110b, continuous or pulsed carrier signals, and receive return signals via one or more sensors 110, 110b, reflected from a multiplicity of moving targets in or on the flowing fluid. The return signals may be analyzed to determine the velocities of the moving targets.

The transmitted carrier signals may be acoustic, electromagnetic, optical, ultrasonic signals, microwave signals, or laser signals. The received reflection signals are typically of the same type as the carrier. Some instruments utilize one or more ultrasonic transducers submerged in the moving fluid. With a submerged sensor, such as sensor 110b, the velocity is measured in a volumetric region "illuminated" by the ultrasonic transducers. The targets may consist of particulate matter, entrained air bubbles, turbulence-induced vortices, or some combination thereof.

Other instruments utilize a sensor positioned above the fluid, for example sensor 110, and the velocity is measured in a particular area on the surface that is "illuminated" by the microwave beam. Again, the targets may be particulates at or near the fluid surface, but simple irregularities in the fluid/air interface are often sufficient to produce a backscattered return signal.

Fluid velocity in a pipe or channel is not completely uniform. In general, it will be slower near pipe or channel boundaries, and faster towards the center or surface. It may therefore vary throughout the illuminated volume or region. The various fluid velocities may be summarized statistically by a probability density function (PDF) curve. Integrating this curve produces a statistical mean velocity for the volume or area under observation.

As the targets moving in different portions of the fluid may be moving at different velocities, the received signals may thus consist of reflections from a high multiplicity of "distributed targets". A high multiplicity of targets provides a range and distribution of fluid velocities, such that overall, the mean velocity (or like statistic) is a fair representation. This is in contrast to military Radar or Sonar systems that track a smaller number of distinct targets.

Some conventional flow instruments estimate the Doppler spectrum of received signals, and use this as a surrogate for the probability density function (PDF) of the fluid velocity. Other instruments observe statistical correlations between successive received reflection signals. Such instruments are not technically "Doppler" instruments, but they nonetheless do obtain a surrogate velocity PDF. This could be called a "correlation spectrum". The term "estimated velocity spectrum" is used herein to signify either a Doppler or correlation spectrum.

In order for a Doppler or correlation spectrum to function as a surrogate velocity PDF, the ideal case is that targets be uniformly distributed throughout the measured volume or area, that these targets be uniform in size (or at least in their reflective cross section), and that they be moving at the actual speed of the fluid. If any of these assumptions is violated, then the estimated velocity spectrum obtained may not be a fair representation of the true velocity PDF, and the measurement instrument will produce incorrect results. Unfortunately, all three assumptions are routinely violated in wastewater flows.

In real-world wastewater (and surface-water) flows, there exist a variety of target sizes. If the range of target sizes is wide, then reflections from the largest targets will dominate the received signals. Real-world wastewater is characterized by some density of distributed particulate targets with the occasional appearance of one or a few very large targets. Because there are so few large targets, a uniform distribution at any given moment is essentially impossible. Moreover, the reflections from large targets can be orders-of-magnitude stronger than reflections from typical targets, and these reflections will tend to dominate the received signal when they are present. Adopting a term from radar, such targets are referred to herein as "bright targets" (also abbreviated as "BT").

Though a bright target might dominate the received spectrum, no harm would be done if it happened to be moving at the average fluid velocity. The likelihood of this, however, is slight. Under a still-optimistic statistical model, the velocity of any particular BT is a random variable, drawn according to the true velocity PDF. Were this true, then long-term averaging of instantaneous instrument outputs would yield a true average velocity, although a plot of measurements vs. time would still be quite noisy.

This behavior is, in fact, observed in many instrument installations. In less favorable installations, the velocities seen for BT's may bear little relationship to the true velocity PDF. A common cause is some kind of upstream flow obstruction that causes the fluid to slow. The fluid speeds up once the obstruction is passed, and so do small particulate targets within it. But larger targets, being more massive, will take longer to accelerate, and may not have reached terminal velocity by the time they pass the flow measurement instrument.

Many collection systems have turbulent flow conditions. A given infinitesimal fluid region may have a speed and direction very different than the average flow in the channel. Anyone who has observed eddies in a natural water course will have noted that some sections of water may even be flowing "upstream". With uniform targets, this is not a problem: the Doppler spectrum becomes much broader, but its mean value still represents the mean channel velocity to an acceptable degree. But if a bright target becomes caught in an eddy or vortex, it can return a completely misleading Doppler signature. This may cause positive or negative "spiking" in the measured flow velocity.

Accordingly, under favorable conditions bright targets cause short-term measurement errors ("target noise"), but useful measurement results may be possible with long-term averaging. However, under unfavorable conditions (which tend to be much more realistic in certain context having non-uniform flow), even long-term averages will be biased.

Accordingly, an embodiment provides a measurement instrument, for example measurement instrument 100, which improves the measurements made by reflective flow meters, even in problematic situations. An embodiment reduces short-term target noise and long-term bias. An embodiment improves measurements in common cases where the per-measurement time and/or energy are limited, for example by meter design.

FIG. 2 depicts an example submerged Doppler ultrasound probe in an open channel. It is worth briefly noting that the description provided herein is generally applicable to other meters, for example a meter including sensor 110, in addition to submerged meters, with appropriate modifications to the terminology, where applicable. Moreover, as described herein, the description uses a "Doppler" meter or measurement instrument 100 as an example, although other measurement instruments, not strictly "Doppler" in nature, may also be employed according to the various embodiments described herein.

In FIG. 2, a bright target 111 is just entering the ultrasonic field of view. The time duration within which the BT can be sensed by the probe is given by $$\Delta t = d/v \quad (1)$$

wherein v represents the BT velocity and d is the linear distance over which the BT is within view.

For the geometry of FIG. 2, equations (2) and (3) are two example formulas expressing the linear distance to be used in equation (1). Thus is determined the bright target 111 transit time, based on the bright target 111 velocity and various geometrical values. The time required for the bright target 111 to exit the sensor's 110b approximately conical field of view is $\Delta t_0$, obtained by using $d_0$ in equation (1). The time required for the bright target 111 to pass the sensor 110b completely is $\Delta t_1$, obtained by using $d_1$ in equation (1).

$$d_0 = \frac{h}{\tan(\alpha - \beta)} - \frac{h}{\tan(\alpha + \beta)} \quad (2)$$

$$d_1 = \frac{h}{\tan(\alpha - \beta)} \quad (3)$$

Analogous equations may be developed for other sensors and installation geometries.

Figure 3:
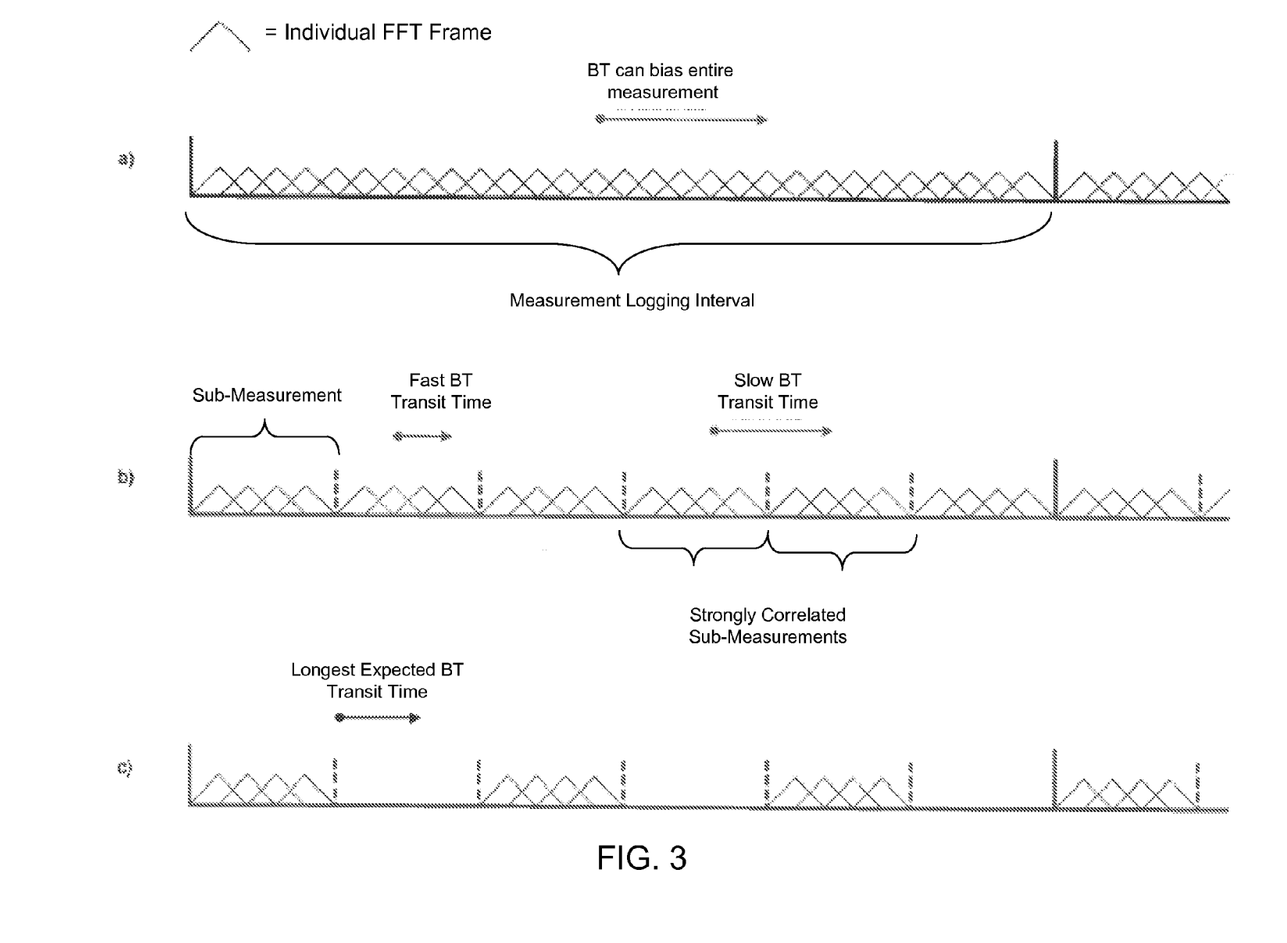
FIG. 3 illustrates examples of spacing sub-measurements.

FIG. 3 depicts an example refinement of the scheduled Doppler measurements into sub-measurements, many of which are statistically independent. In FIG. 3a, a conventional measurement scheme is depicted, wherein a multiplicity of overlapping Fast Fourier Transform (FFT) frames is acquired and averaged together. (Non-overlapping FFT frames may also be used.) These FFT frames are indicated by the "^" symbol. In FIG. 3b, each scheduled Doppler measurement has been divided into a number of sub-measurements, each based on a distinct set of FFT frames. An embodiment may employ such scheduled sub-measurements to improve the measurement accuracy. In FIG. 3c, certain of the sub-measurements have been eliminated. An embodiment may employ an elimination of some sub-measurements in order to save power.

Figure 4:
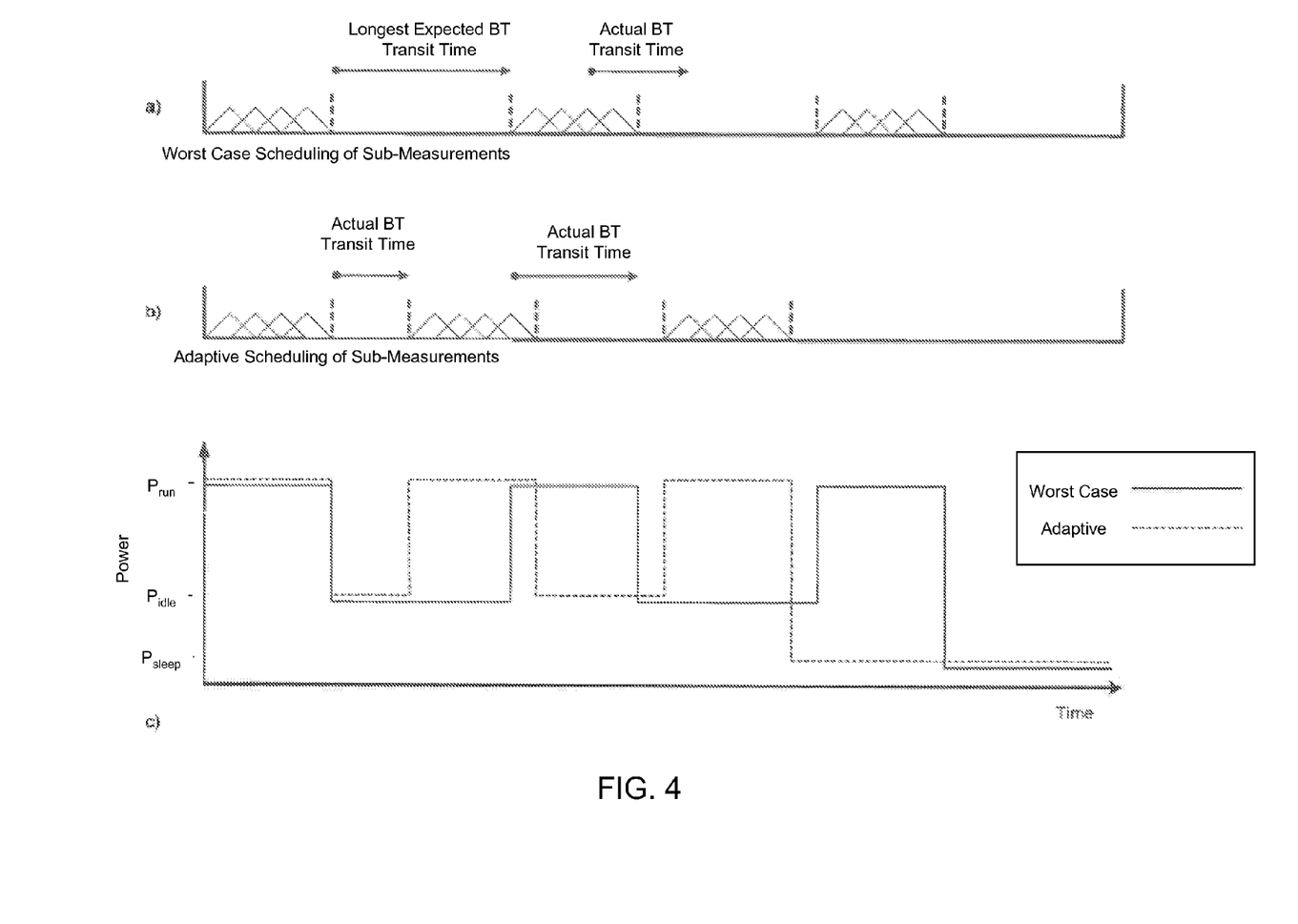
FIG. 4 illustrates examples of spacing policies for sub-measurements.

FIG. 4 depicts a further example of power savings obtainable by methods of scheduling the sub-measurements employed by various embodiments. In the examples that follow, an ultrasonic Doppler measurement instrument using a submerged transducer assembly is used as a non-limiting example. As noted throughout, this example is solely for convenience of exposition; the general principles to be explained are applicable with little modification to a wide variety of measurement instrument types.

Maximum Bright Target Transit Time

A particular bright target may be within the instrument's "field of view" for a maximum time. The worst case (in terms of biasing a measurement statistic representative of overall flow velocity) is that a BT enters the field of view just as a measurement begins. Furthermore, the worst case is that it passes through the widest linear extent of the sensor beam.

For example, FIG. 2 depicts a bright target positioned at the farthest extent of an ultrasonic velocity sensor's 110b main lobe (illustrated as the region bounded by lines 112), and moving at velocity v. The sensor's 110b complete field of view depends on the fluid height, h, the beam angle, $\alpha$, and the angular half-width of the ultrasonic beam, $\beta$. The time required for the BT 111 to exit the sensor's 110b main lobe beam is $d_0/v$ (equations (1) and (2)). This is one measure of the BT's time "in view", but not the most conservative one. The conical beam pattern shown in FIG. 2 is an idealization of a sensor's 110b main lobe.

However such sensors 110b also have less sensitive side lobes with other orientations. Since the BT has such high reflection strength, there is a possibility that it could produce a significant response on a side lobe, perhaps as it passed directly over the transducer at short distance. Therefore, a conservative bound on the maximum BT transit time is the time required for it to travel past the probe completely; this is $d_1/v$ (equations (1) and (3)). Analogous equations may be developed for other measurement instrument types and orientations other than this non-limiting example.

Minimization of Measurement Noise and Bias Due to Bright Targets

A bright target affects the estimated velocity spectrum. FIG. 3a shows an example time plot representing periodic velocity measurements of a conventional measurement instrument. The fundamental measurement logging interval is represented by the dark vertical bars. Within each interval, a Doppler spectrum is estimated by averaging the results of a multiplicity of Fourier transforms (FFT's). Specifically, the received reflection signal is broken into a number of (possibly overlapping) data frames (individual FFT frames, "^" in the figures). Each data frame is processed by a FFT, after which a frequency-domain histogram is constructed. Each histogram "bin" is centered on a particular Doppler frequency. The bin amplitudes are typically the squared magnitudes of (complex) FFT outputs, but sometimes "unsquared" magnitudes are used instead. The resulting histogram is a discrete frequency domain estimate of the Doppler spectrum called a periodogram.

An average of periodograms may be computed from multiple frames to reduce the uncertainty of the spectral estimate. That is, the amplitudes of corresponding spectral density bins from each frame are averaged. Often, sequential FFT frames overlap as shown in the figures, but this is not required. Some details (e.g. data tapering) have been omitted from this description because they are considered to be well-known to those skilled in the art of spectral estimation. The point is that periodogram estimates from multiple data frames may be combined by averaging them on a bin-by-bin basis.

Bin-by-bin averaging works well under the naïve assumption of uniformly distributed targets, uniform in size. Measurement instruments designed in this fashion perform well in laboratory testing, but poorly in actual, practical settings, such as when used in wastewater flows. The reason is an underlying assumption that successive FFT frames are uncorrelated. But in the presence of a bright target, successive FFT frames may be strongly correlated. For example, a BT will cause (typically) one very large frequency bin value, and this may appear in multiple periodograms. Even after averaging, the resulting estimated Doppler spectrum will show a large peak corresponding to the BT velocity, and the reported fluid velocity will be incorrectly biased towards this peak.

Numerous alternatives to overlapped segment averaging are known to those skilled in the art of spectral estimation. These include lag window estimators, multi-taper estimators, and parametric estimators. In addition, multi-scale spectral estimation may be used in this context, as taught by U.S. patent application Ser. No. 13/569,965, entitled DOPPLER MEASUREMENT INSTRUMENT AND DOPPLER MEASUREMENT PROCESSING METHOD, filed on Aug. 8, 2012, which is incorporated herein by reference. However, all such alternative methods are subject to errors caused by bright targets.

In an embodiment, a fundamental measurement is obtained for a predetermined duration/interval, as illustrated in FIG. 3a. The interval is divided into a series of sub-intervals. For each sub-interval, a corresponding sub-measurement is obtained, as illustrated in FIG. 3b. The technique for each sub-measurement is preferably the same. Additionally, the fundamental measurement technique and the sub-measurement technique may be the same. For the purposes of this disclosure, a sub-measurement is a measurement obtained having a relationship with a corresponding sub-interval. Each sub-measurement comprises a distinct velocity estimate. The sub-measurements may be combined in various ways to form a final (logged) measurement, but bin-by-bin spectral averaging is not performed across the sub-measurement boundaries. For the purpose of this disclosure, a spacing policy shall include a fixed or dynamic (e.g., adaptive) policy for selecting the number, length and/or spacing of sub-intervals, for selecting or using particular sub-interval(s) to obtain corresponding sub-measurements and/or for determining when to (and/or when not to) obtain a sub-measurement.

As described further herein, when multiple sub-measurements are averaged together, the root-mean-squared target noise is inversely proportional to the square-root of the number of sub-measurements. However (for a fixed logging interval), increasing the number of sub-measurements decreases the length of each. Some minimum length is necessary for each sub-measurement, as will be described further herein. Therefore, the number of sub-measurements per logged measurement cannot be increased without bound, unless the interval between logged measurements is also increased.

Sub-measurements have some minimum time duration, for several reasons. In some embodiments, each sub-measurement will comprise several FFT frames. Each FFT frame has a minimum length based on the desired frequency resolution. Moreover, it is desirable to average several FFT frames (as an example, no fewer than four) to reduce the uncertainty of each sub-measurement. Even when the sub-measurements are not FFT-based, the similar principles apply. Additionally, there may be little to no statistical benefit in making the sub-measurement time shorter than the typical BT transit time.

Averaging of all the sub-measurements is an appropriate strategy when bright targets are believed to have the same velocity PDF as other targets. When the BT velocities are unrepresentative of other targets, averaging BT-contaminated sub-measurements and uncontaminated sub-measurements may well bias the results.

In an embodiment, additional "target set processing" options are provided as means to reduce measurement bias. In what may be referred to as an "Average All" mode, the sub-measurement velocities are arithmetically averaged together, as described herein. In what may be referred to as a "Robust Filtering" mode, the sub-measurements may be first sorted by (signed) numerical velocity. Then, those velocities in the middle may be averaged, while a predetermined number of the largest and smallest velocities may be ignored. In what may be referred to as a "Reject Spikes" mode, a modification of Robust Filtering mode may be employed in which the sorting may be done according to absolute value of velocity, and only the largest velocities may be excluded from the average. In what may be referred to as a "Reject Drops" mode, a modification of Robust Filtering mode may be employed in which the sorting may be done according to the absolute value of velocity, and only the smallest velocities may be excluded from the average. In another variant embodiment, only those sub-measurements returning zero velocity are excluded. Alternatively, sub-measurements returning zero velocity are excluded along with other excluded sub-measurements. This mode may prove to be useful in "target poor" sites (i.e. lacking a typical level of detectable targets).

In some embodiments of target set processing, the number of ignored or excluded sub-measurements is a pre-determined fraction of the total sub-measurement count. In some embodiments, a statistic such as standard deviation is estimated and used to determine which sub-measurements are outliers. For example, sub-measurements more than 2.5 standard deviations from the mean may be rejected, and the mean recalculated with those that remain. Various other methods of identifying outliers are known from statistical practice, and may be used within the scope of this disclosure.

One approach that may be considered is to log all the sub-measurements and perhaps smooth the data later. However, this approach may dramatically increase the amount of data that must be stored and perhaps transmitted. As such, this imposes additional costs in memory, communications bandwidth, energy, and the like, and may prove impractical given the type of measurement instrument used for such an implementation. Also, commonly-used smoothing algorithms assume equally spaced data, whereas data points acquired in practice are not always equally spaced, as will be further described below. Additionally, for many commercial applications, some of the target set processing modes described herein (e.g. Robust Filtering, Reject Spikes, and Reject Drops) are superior to ordinary smoothing, the later often being some simple form of a moving average. Still, nothing prevents delaying target set processing for later, even if doing so may be more costly in some respects.

Sub-Measurement Scheduling for Energy Reduction

In FIGS. 3a and 3b, measurement activity may be undertaken during the entirety of each logging interval. This may be impractical when the instrument is powered from batteries. It thus may be desirable to reduce the required energy per logged measurement in order to achieve the maximum unattended deployment time for a given battery capacity. Again, such considerations may need to be taken into account for certain applications.

FIG. 3c illustrates an example embodiment wherein a reduced number of sub-measurements are performed with time spacing between them. The energy consumed may be roughly in proportion to the number of sub-measurements. Reducing the number of sub-measurements thus accomplishes a reduction in energy and an increase in battery life. In FIG. 3c, an example number of specified sub-measurements are done during each logging interval. The time spacing between these sub-measurements is set as widely as possible, given the chosen logging interval. This decreases the likelihood that a bright target observed during one sub-measurement interval is still present during the next. Indeed, if the spacing is set longer than the slowest expected BT transit time, then the sub-measurements will be statistically independent of one another. This will produce the maximum noise reduction when the sub-measurements are averaged together.

Whereas in FIG. 3a, a single bright target could corrupt the entire measurement, in FIG. 3c (with sufficient spacing) only one sub-measurement of N sub-measurements can be corrupted by a particular bright target. After averaging, a single BT's influence on the logged reading is then limited to one part in N, regardless of the BT's reflection strength. In field trials with as few as four sub-measurements, an measurement instrument operating similar to the example of FIG. 3c produced significant reductions in target noise.

This is to be contrasted with the two sub-measurements in the middle of FIG. 3b, both of which are influenced by the same bright target. Since the strong BT reflection dominates both sub-measurements, they will be strongly correlated. Including both in the same average will achieve no statistical benefit. From the standpoint of noise reduction, acquiring the second of these two sub-readings was a waste of energy. Although this may not be true of every adjacent pair of sub-readings, it becomes more likely to be true as bright targets become more common. It also becomes more likely to be true as the sub-measurement length becomes shorter in comparison to BT transit times, for then it is more likely that adjacent sub-readings are affected by the same bright target.

Accordingly, various ways of combining sub-measurements enumerated in accordance with the example embodiments described herein are referred to as "target set processing". In FIG. 3c, the sub-measurements may be spaced so that the reflective signals used by each sub-measurement come from completely independent target sets. All of the target set processing options enumerated for FIG. 3b are applicable to the example of FIG. 3c.

In FIG. 4(a-c), example scheduling methods are shown that can provide additional energy savings when used with a measurement instrument having power management. The measurement instrument consumes power $P_{run}$ during sub-measurements, power $P_{idle}$ between sub-measurements, and power $P_{sleep}$ between the end of the last sub-measurement in a logging interval and the beginning of the next logging interval. It is typical that $P_{run} > P_{idle} > P_{sleep}$. Typically the measurement instrument, or component thereof, may only transmit an emitted signal during the scheduled sub-measurement intervals. FIG. 4a illustrates a so-called "worst case" scheduling method in which the intervals between sub-measurements have been set the longest expected BT transit time. Because the sub-measurements are thus essentially guaranteed to be statistically independent, as described herein, acceptable measurement performance may be obtained with a smaller number of sub-measurements.

Using a smaller number of sub-measurements reduces the total time during which power $P_{run}$ is consumed. Instead, the instrument spends a longer time consuming at $P_{sleep}$ the end of the logging interval. This can save significant energy. The scheduling method is called "worst case" because the longest expected bright target transit time must be estimated in advance. In some embodiments, worst-case spacing of the sub-measurements may be shorter than the maximum uniform spacing depicted in FIG. 3c. If so, less time will be spent consuming power $P_{idle}$ and more time will be spent at the $P_{sleep}$ power level, thus reducing the energy consumed per logged reading.

FIG. 4b illustrates a so-called "adaptive" scheduling method in which the intervals between one sub-measurement and the next are changed accordingly, for example as informed by spectral data acquired in one or more earlier sub-measurement. This allows many "idle" intervals to be further shortened, thereby lengthening the "sleep" interval at the end. This results in additional energy savings over the "worst-case" scheduling method of FIG. 4a.

FIG. 4c is an example graph illustrating the power vs. time for the worst-case and adaptive scheduling methods. The reduction in energy when using adaptive scheduling can be seen by comparing the areas under these curves. In order to practice the adaptive scheduling method, an estimate of current BT transit time may be obtained from each sub-measurement so as to determine when the next sub-measurement should commence. To determine the required idle time between sub-measurements, the flow instrument may estimate the velocity of the slowest BT seen during the just-completed sub-measurement, and divide that into the maximum "in view" path length. As shown by the example of FIG. 2, this path length may depend on the sensor and site geometries, and will often be a function of the fluid height, h. It is common that the measurement instrument already measures the fluid height because knowing the height is a requirement to determine volumetric flow.

In an embodiment, the velocity of the slowest bright target seen during the prior sub-measurement interval is obtained by examining the Doppler spectrum obtained during that interval. Bright targets are characterized by large peaks in the Doppler spectrum. Therefore, it is sufficient to examine any significant non-carrier peaks in the Doppler spectrum and choose the peak having the least Doppler shift. This peak is indicative of the slowest-moving bright target. In an embodiment, a correlation-based velocity spectrum is used instead of a Doppler spectrum.

If no distinct peaks are apparent, a pre-determined minimum idle delay may be used. Alternatively, the idle delay may be set as a particular fraction of the mean velocity calculated during the just-completed sub-measurement. In some implementations, a maximum idle delay may be enforced to ensure that all sub-measurements complete within the specified logging interval.

Bias Caused by Bright Targets

Assuming that sub-measurements provide unbiased (but possibly noisy) velocity estimates when no bright targets are present, let the true mean velocity be $v_0$. If N independent sub-measurements, $v_i$, are acquired and averaged together to obtain the logged velocity estimate, $\hat{v}$, let $T_{sub}$ be the time duration of one sub-measurement.

The appearance of bright targets (BT) may be modeled as a Poisson point process with parameter $\lambda$ expressing the probability of appearance per unit time. If it is assumed that BT's return so much signal that $v_i = v_{BT}$, whenever a BT is present during the ith sub-measurement, take $\{v_{BT}\}$ to be random variables with mean $\bar{v}_{BT}$. The probability that a BT corrupts a sub-measurement is then $\lambda T_{sub}$.

The following provides an example for computing the expected value of the logged velocity. Here $E\{\ \}$ denotes statistical expectation $$E\{\hat{v}\} = E\left\{\frac{1}{N}\sum_{i=1}^{N} v_i\right\}$$

$$= \frac{1}{N}\sum_{i=1}^{N}[E\{v_i\} \cdot Pr\{\text{no BT in } i\} + E\{v_i\} \cdot Pr\{BT \text{ in } i\}]$$

-continued $$= \frac{1}{N}\sum_{i=1}^{N}[v_0 \cdot (1-\lambda T_{sub}) + \bar{v}_{BT} \cdot \lambda T_{sub}]$$

$$= \frac{1}{N}\sum_{i=1}^{N} v_0 + \frac{1}{N}\sum_{i=1}^{N}\lambda T_{sub}(\bar{v}_{BT} - v_0)$$

$$= v_0 + \lambda T_{sub}(\bar{v}_{BT} - v_0)$$

Clearly, $\hat{v}$ is an unbiased estimate of $v_0$ if and only if bright targets and "ordinary" targets have the same mean velocity: $\bar{v}_{BT}=v_0$. Otherwise, the bias gets worse as the bright target rate, $\lambda$, increases. But even when the velocity estimate is unbiased, it may still be quite noisy. This is described next.

Variance: General Case

Assume that individual sub-measurements have variances given by $\sigma_1, \sigma_2, \ldots, \sigma_N$. The covariance matrix for a set of sub-measurements may be written as $$\underline{\Sigma} = \begin{bmatrix} \sigma_1 & & & 0 \\ & \sigma_2 & & \\ & & \ddots & \\ 0 & & & \sigma_N \end{bmatrix}$$

$$\begin{bmatrix} 1 & \rho_{1,2} & \cdots & \rho_{1,N} \\ \rho_{2,1} & 1 & \ddots & \vdots \\ \vdots & \ddots & \ddots & \rho_{N-1,N} \\ \rho_{N,1} & \cdots & \rho_{N,N-1} & 1 \end{bmatrix} \begin{bmatrix} \sigma_1 & & & 0 \\ & \sigma_2 & & \\ & & \ddots & \\ 0 & & & \sigma_N \end{bmatrix}$$

where $\rho_{i,j}=\rho_{j,i}\in[0,1]$ represents the correlation between sub-measurements i and j. The center matrix in the equation above is the correlation matrix for the sub-measurements; call it $\gamma$ for future reference.

Let superscript "T" denote the matrix transpose operation. Collecting the sub-measurements in a vector, $\underline{v}=[v_1, v_2, \ldots, v_N]^T$, and defining the N element vector $\underline{1}=[1, 1, \ldots, 1]^T$, then the average of N sub-measurements may be written in this form:

$$\hat{v} = \frac{1}{N}\underline{1}^T\underline{v}$$

The variance of the average is given by:

$$\text{var}(\hat{v}) = \frac{1}{N^2}\underline{1}^T\underline{\Sigma}\underline{1}$$

$$= \frac{1}{N^2}\underline{\sigma}^T\Upsilon\underline{\sigma}$$

where $\underline{\sigma}=[\sigma_1, \sigma_2, \ldots, \sigma_N]^T$.

Performing the indicated matrix multiplications, the following scalar formula is obtained:

$$\text{var}(\hat{v}) = \frac{1}{N^2}\sum_{i=1}^{N}\sigma_i^2 + \frac{1}{N^2}\sum_{i=1}^{N}\sum_{\substack{j=1 \\ j\neq i}}^{N}\rho_{i,j}\sigma_i\sigma_j.$$

The factor $1/N^2$ occurs in both terms. Since standard deviation is the square root of variance, the measurement uncertainty is inversely proportional to the number of sub-measurements.

Now if the N sub-measurements are independent, then $\rho_{i,j}=0$, the correlation matrix $\gamma$ is an identity matrix, and the second term in the variance formula above vanishes. The variance has its smallest possible value under this circumstance. Conversely, any correlations between sub-measurements due to bright targets will make the variance larger.

Clearly, if only N sub-measurements of given length (due to energy or time constraints) can be acquired, a desirable embodiment is to space them wider than the longest expected bright target transit time, because this will yield the least-noisy velocity estimate.

Variance: Tri-Diagonal Case

To illustrate the advantage of the spacing policy, suppose the sub-measurements are spaced somewhat more closely than the ideal, but still widely enough that a given bright target can overlap no more than two successive sub-measurements. Then $\gamma$ becomes a symmetric tri-diagonal matrix, yielding:

$$\text{var}(\hat{v}) = \frac{1}{N^2}\sum_{i=1}^{N}\sigma_i^2 + \frac{2}{N^2}\sum_{j=1}^{N-1}\rho_{j,j+1}\sigma_j\sigma_{j+1}$$

If a bright target contaminates two adjacent sub-measurements, then $\rho_{j,j+1}\approx 1$ and $\sigma_j\approx\sigma_{j+1}$. If the probability of this happening is $\alpha$, then the expected variance of the velocity estimate is:

$$E\{\text{var}(\hat{v})\} = \frac{1}{N^2}\sum_{i=1}^{N}\sigma_i^2 + \alpha\frac{2}{N^2}\sum_{j=1}^{N-1}\sigma_j^2.$$

As $\alpha\to 1$ and pair-wise correlations become ubiquitous, the expected variance becomes nearly three times larger than if the sub-measurements had been optimally spaced. ($\alpha$ as used here is a probability value, and has nothing to do with the geometrical angle of equations (2) and (3).)

Accordingly, an embodiment provides for sub-measurements that are appropriately spaced according to a policy that minimizes the influence of bright targets on the velocity statistic produced by a measurement instrument, for example measurement instrument 100. The various spacing or timing of the sub-measurements may be modified to account for various practical implementations, for example flow estimation in an open channel waste water setting where multiple bright targets typically influence velocity measurements. As noted throughout, although a Doppler measurement instrument was used as a specific example measurement instrument, the aspects of the described example embodiments may be extended to other measurement instruments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A fluid flow measurement instrument, comprising:
an emitter that emits a signal that interacts with a fluid flow;
a sensor that detects reflections of the emitted signal and produces a signal representative of the reflections of the emitted signal;
the emitter being programmed to operate in a plurality of modes and according to a spacing policy, the plurality of modes comprising;
an operating mode in which a series of signals are emitted during a measurement logging interval; and
an idle mode in which the emitter does not emit a signal for a period during the measurement logging interval;
and
a meter being coupled to the sensor and configured to:
produce two or more sub-measurements within a single measurement logging interval, wherein the two or more sub-measurements are separated in time according to a spacing policy of the measurement logging interval to produce substantially independent velocity estimates; and
combine the sub-measurements of a measurement logging interval to produce a fluid flow velocity estimate;
wherein the spacing policy reduces bright target bias; and
wherein the spacing policy is determined according to a bright target velocity.

2. The fluid flow measurement instrument of claim 1, wherein the two or more sub-measurements are chosen from a continuous stream of sub-measurements.

3. The fluid flow measurement instrument of claim 1, wherein the two or more sub-measurement are chosen from a discontinuous set of sub-measurements.

4. The fluid flow measurement instrument of claim 1, wherein the spacing policy is determined according to a lowest expected bright target velocity.

5. The fluid flow measurement instrument of claim 1, wherein the spacing policy is determined from a previous velocity estimate.

6. The fluid flow measurement instrument of claim 1, wherein the two or more sub-measurements are selected from among a plurality of sub-measurements through sorting by value.

7. The fluid flow measurement instrument of claim 6, wherein sorting by value is a sorting process selected from the group consisting of:
excluding sub-measurements having absolute values larger than a threshold;
excluding sub-measurements having absolute values smaller than a threshold; and
including sub-measurements having signed values between a first threshold and a second threshold.

8. The fluid flow measurement instrument of claim 1, wherein the two or more sub-measurements are selected from among a plurality of sub-measurements based on one or more thresholds, the thresholds being determined based on a plurality of sub-measurement values.

9. A fluid flow estimating method, comprising:
emitting, with an emitter, a signal that interacts with a fluid flow;
the emitter emitting a signal in a plurality of modes and according to a spacing policy, the plurality of modes comprising:
an operating mode in which a series of signals are emitted during a measurement logging interval; and
an idle mode in which the emitter does not emit a signal for a period during the measurement logging interval;
producing with a sensor a signal representative of reflections of the emitted signal;
producing, with a meter coupled to the sensor, two or more sub-measurements within a single measurement logging interval, wherein the two or more sub-measurements are separated in time according to a spacing policy of the measurement logging interval to produce independent substantially velocity estimates; and
combining the sub-measurements of a measurement logging interval to produce a fluid flow velocity estimate,
wherein the spacing policy reduces bright target bias; and
wherein the spacing policy is determined according to a bright velocity.

10. The fluid flow estimating method of claim 9, wherein the two or more sub-measurements are chosen from the group consisting of:
a continuous stream of sub-measurements; and
a discontinuous set of sub-measurements.

11. The fluid flow estimating method of claim 9, wherein the spacing policy is determined according to a value selected from the group consisting of:
a lowest expected bright target velocity; and
a previous velocity estimate.

12. The fluid flow estimating method of claim 9, wherein the two or more sub-measurements are selected from among a plurality of sub-measurements through sorting by value.

13. The fluid flow estimating method of claim 12, wherein sorting by value is a sorting process selected from the group consisting of:
excluding sub-measurements having absolute values larger than a threshold;
excluding sub-measurements having absolute values smaller than a threshold; and
including sub-measurements having signed values within a range;
wherein one or more of the threshold and the range is determined based on a plurality of sub-measurement values.

14. A fluid flow estimating program product, comprising:
a non-transitory device readable storage medium storing program code executable by a processor of a measurement instrument, the program code comprising:
program code for emitting, with an emitter, a signal that interacts with a fluid flow;
the emitter emitting a signal in a plurality of modes and according to a spacing policy, the plurality of modes comprising:
an operating mode in which a series of signals are emitted daring a measurement logging interval; and
an idle mode in which the emitter does not emit a signal for a period during the measurement logging interval;
program code for producing with a sensor a signal representative of reflections of the emitted signal;
program code for producing two or more sub-measurements within a single measurement logging interval, wherein the two or more sub-measurements are separated in time according to a spacing policy of the measurement logging interval to produce substantially independent velocity estimates; and program code for combining the sub-measurements of a measurement logging interval to produce a fluid flow velocity estimate, wherein the spacing policy reduces bright target bias; and wherein the spacing policy is determined according to a bright velocity.

* * * * *